(12) United States Patent
Bruck

(10) Patent No.: US 8,573,686 B2
(45) Date of Patent: Nov. 5, 2013

(54) SCISSOR RETRACTABLE HEADREST

(75) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 349 days.

(21) Appl. No.: 13/010,852

(22) Filed: Jan. 21, 2011

(65) Prior Publication Data

US 2011/0175422 A1 Jul. 21, 2011

Related U.S. Application Data

(60) Provisional application No. 61/297,019, filed on Jan. 21, 2010.

(51) Int. Cl.
*A47C 1/02* (2006.01)

(52) U.S. Cl.
USPC .......................................................... 297/61

(58) Field of Classification Search
USPC .................................................. 297/61, 410
See application file for complete search history.

(56) References Cited

U.S. PATENT DOCUMENTS

| | | | |
|---|---|---|---|
| 3,774,963 A | 11/1973 | Lowe | |
| 3,836,198 A | 9/1974 | Mizelle | |
| 4,451,081 A | 5/1984 | Kowalski | |
| 4,762,367 A * | 8/1988 | Denton | 297/409 |
| 5,364,164 A | 11/1994 | Kuranami | |
| 5,553,919 A | 9/1996 | Dennis | |
| 6,192,565 B1 | 2/2001 | Tame | |
| 6,390,558 B2 | 5/2002 | Fischer et al. | |
| 6,607,242 B2 | 8/2003 | Estrada et al. | |
| 6,648,415 B2 | 11/2003 | Bartels | |
| 6,767,064 B2 | 7/2004 | Veine et al. | |
| 7,118,171 B2 * | 10/2006 | Fowler et al. | 297/61 |
| 7,140,687 B2 | 11/2006 | Hoekstra et al. | |
| 7,458,640 B1 | 12/2008 | Hill | |
| 2007/0085401 A1 * | 4/2007 | Hunziker et al. | 297/410 |
| 2008/0258512 A1 | 10/2008 | Rogers | |
| 2009/0058149 A1 | 3/2009 | Lindsay | |
| 2009/0072593 A1 | 3/2009 | Hoffman et al. | |
| 2009/0102255 A1 | 4/2009 | D'Agostini et al. | |

* cited by examiner

*Primary Examiner* — Milton Nelson, Jr.
(74) *Attorney, Agent, or Firm* — Gifford, Krass, Sprinkle, Anderson & Citkowski, P.C.; Douglas J. McEvoy

(57) ABSTRACT

A retractable headrest exhibiting a plate shaped support embedded within a seatback. A scissor linkage includes a plurality of interconnecting and overlapping link arms pivotally secured to the plate support at one end thereof. A spring biased rivet is disposed at an overlapping intermediate location of the link arms for travel along a linear extending channel defined in the support. A carriage connects to the other end of the scissor linkage and is linearly displaceable along the plate support. A headrest support rod is connected to the carriage and extends from the seatback. A spring loaded and rotatable pawl is pivotally supported proximate a base end of the scissor linkage and includes a catch location in engagement with a first pin extending from the support. A first cable extends from a first remote location and connects to the pawl. A second cable extends from a second remote location and connects to the carriage. During rotation of the seatback from an upright design position to a forward dump position, actuation of the first cable pivots the pawl against its bias to unseat the catch location from the pin, concurrent actuation of the second cable exerting a pulling force to compress the scissor linkage to a retracted position.

19 Claims, 8 Drawing Sheets

SCISSOR RETRACTABLE HEADREST

CROSS-REFERENCE TO RELATED APPLICATIONS

This Application claims the benefit of U.S. Provisional Application 61/297,019 filed on Jan. 21, 2010.

FIELD OF THE INVENTION

The present invention relates generally to elevatable headrest support mechanisms, such as incorporated into folding vehicle seats. More specifically, the invention discloses a retractable headrest incorporating a scissor linkage mechanism exhibiting a plurality of interconnecting and overlapping link arms supported upon a plate shaped support. A release lever and associated cable is provided for triggering retraction of the headrest, such as during forward dumping motion of the seatback.

BACKGROUND OF THE INVENTION

The prior art is documented with various types of adjustable headrest assemblies. Hoekstra, U.S. Pat. No. 7,140,687 teaches a spring loaded headrest with a head support connected to a rail adjustably mounted to a housing for moving the headrest between use and stow positions. The rail is further biased to the stow position upon releasing a lock member and such that movement of the seatback from the use to stow positions cause the headrest to likewise retract. A similar headrest retraction mechanism is depicted in U.S. Pat. No. 6,192,565, to Tame and by which a control mechanism automatically moves the headrest between deployed and retracted positions in response to pivotal movement of the seat back. Other examples of prior art headrest designs include those disclosed in each of Veine, U.S. Pat. No. 6,767,064, Fischer, U.S. Pat. No. 6,390,558, Estrada, U.S. Pat. No. 6,607,242 and Bartels, U.S. Pat. No. 6,648,415.

SUMMARY OF THE INVENTION

The present invention discloses a retractable headrest incorporating a scissor linkage mechanism exhibiting a plurality of interconnecting and overlapping link arms supported upon a plate shaped support embedded within a seatback. A support rivet is disposed at a central pivotal interconnecting location of the plurality of link arms and is mounted for displacing travel along a linear extending slot defined in the support. A clock spring is mounted about the rivet and includes an exteriorly curled end which engages an associated link arm for biasing the linkage in an extending direction.

A spring loaded and rotatable pawl is pivotally supported proximate a base end of the scissor linkage. Upon being triggered by a retractable cable, the pawl is rotated such that a configured catch location unseats from a first pin projecting from a reinforced surface location of the support, such as proximate but in non-interfering position relative to a base situated link arm. Upon pivoting the pawl, the linkage is freed to compress/retract, concurrent with downward displacement of the headrest bun and supporting rod to a retracted position. A second stop pin located on the base link arm engages the pawl to prevent over-rotation of the pawl in the retraction position.

A carriage is secured to an upper end of the scissor linkage and to which is secured the support rod associated with a shingled or other suitable headrest bun. A release lever is situated on a surface of the seat (such as the seat back) and from which one or more cables extend to a seatback release mechanism and/or directly to the carriage or pawl.

Upon triggering the lever, the seatback is caused to pivot forwardly and a secondary cable in connection to the carriage retracts the headrest rod against its spring coil bias, such occurring at a point at or prior to the seatback achieving a dump position relative to the seat bottom. Timed retraction of the headrest is useful in preventing the forwardly rotating seatback from contacting the back surface of a forward row situated seat and/or further in order to provide adequate floor clearance during subsequent tumble of the seatback and bottom (such as further to permit occupant ingress/egress to or from a rear of the vehicle interior). The inner displacement of the second cable associated with the seatback dump further provides the necessary holding force for maintaining the headrest in its retracted position. Upon reverse and upright rotation of the seatback to the upright position relative to the seat bottom, the headrest bun is capable of being released by the triggering of the first cable.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to the various illustrations, and in particular the assembly views of FIGS. 1-5, the present invention discloses a retractable headrest generally shown at 10 incorporated into a pivotal (forward dumping) seatback 2, see further FIGS. 6-10, which is pivotally connected to a seat bottom 4.

Figure 1:
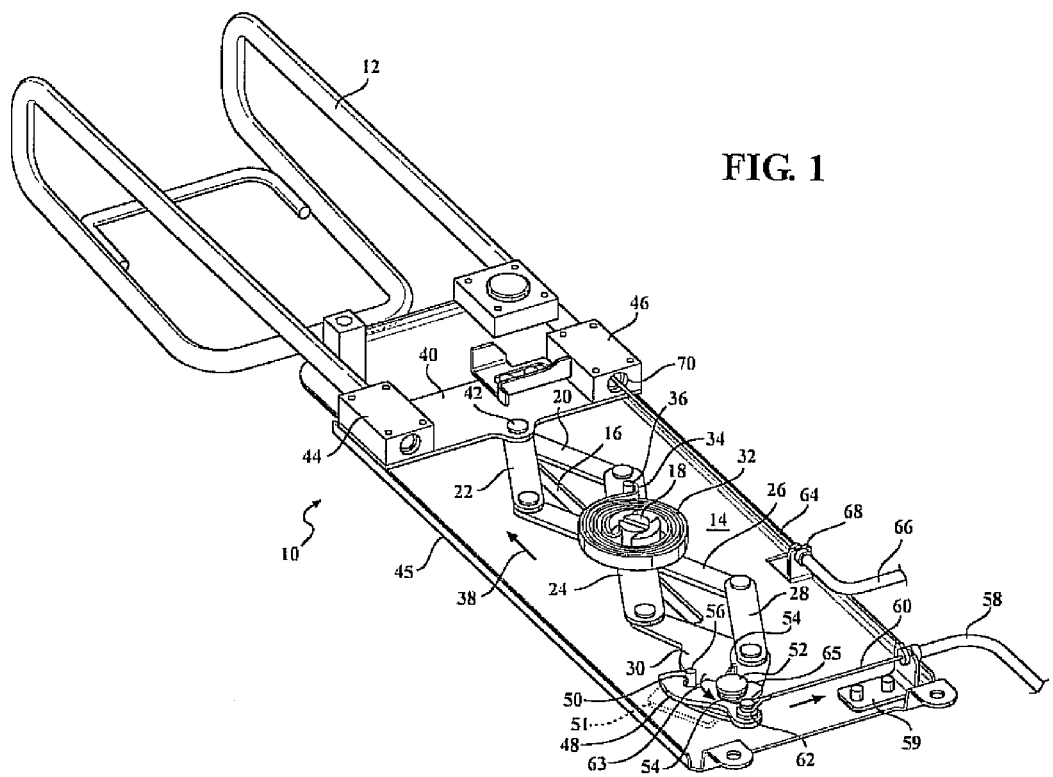
FIG. 1 is a perspective view of the retractable headrest in an extended position.

The headrest mechanism is generally hidden from view in FIGS. 6-10 (being embedded into the seatback 2), with the exception of a support rod 12 which as best shown in FIG. 1 is illustrated as a multi-bent tubular profile with first and second lower extending engaging ends and which is configured for supporting in use a shingled shape headrest bun 6 further exhibiting a generally angled side profile and such that, upon being retracted, substantially overlays the top and central upper front of the seatback 2 in order to minimize its profile during pivoting of the seatback.

Referring again to FIGS. 1-5, the headrest 10 exhibits a generally planar and rectangular plate shaped support 14 including a generally central located and linear extending channel (see as further defined by inner perimeter wall 16) which extends along the central interior of the plate support 14 a spaced distance between its upper and lower ends. A main rivet 18 is seated within the channel 16 in a manner which permits it to be linearly traversable along its length and which, as will be subsequently described, is incorporated into a generally central interconnecting location of a scissor linkage mechanism.

The linkage mechanism is further exhibited in the illustrated embodiment by a plurality of three individual pairs of interconnecting and overlapping link arms depicted by a first pair of upper-most link arms 20 & 22, a second pair of intermediate and overlapping link arms 24 & 26 pivotally interconnected to respective ends of the upper most link arms 20 & 22 (at a middle interface of which the linear traversable pin 18 is mounted in inter-rotative permissive fashion) and a third lower most pair of link arms including a further standard link arm 28 and an enlarged and triggering base link arm 30. As shown, the pairs 20 & 22, 24 & 26 and 28 & 30 of link arms are arranged in rotatably interconnecting and overlapping fashion between a lower most fixed location (see at 31 in underside view of FIG. 3 and established by pivotally converging locations of the pair 28 & 30) and an upper linearly displaceable location (see further at 42 established by pivotally converging of the pair 20 and 22, the displaceable location 42 being provided in connection to a carriage 40 which is supported in linearly displaceable fashion upon the plate support 14 and from which extends the headrest rod 12 as will be further described below). As further shown, the link arms collectively establish a pivotal interface at each of six collectively scissor defining locations.

A clock spring 32 is mounted in rotatably biased fashion about the main displaceable rivet 18 and includes an exteriorly curled end 34 which engages link arm 24, best illustrated in FIG. 1 by a support pin (or rivet) 36 which extends from a surface of the link arm 24. The influencing/loading force of the clock spring 32 is exerted directly on the intermediate pair of overlapping link arms 24 and 26 (in a generally counter clockwise direction as depicted in FIG. 1) and results in an overall outward biasing force referenced by arrow 38 exerted against the upper end carriage 40 secured to the uppermost pivoting connection 42 associated with the uppermost link arms 20 and 22. As further depicted, collapsing/retraction of the scissor connected pairs of links (FIG. 5) results in the winding/extension of the clock spring 32 such that the curled end 34 displaces to a position depicted in FIG. 5, as well as is shown in phantom at 34' in FIG. 4 in comparison to its pre-displaced and fully extended position of the link arm supported pin (see also retracted position 36').

The carriage 40 exhibits a generally thin and planar shaped component supported in widthwise extending fashion upon the surface of the plate support 14 and further including end mounted superstructure shaped supports 44 and 46 for receiving the extending ends of the tubular shaped support rod 12.

Figure 2:
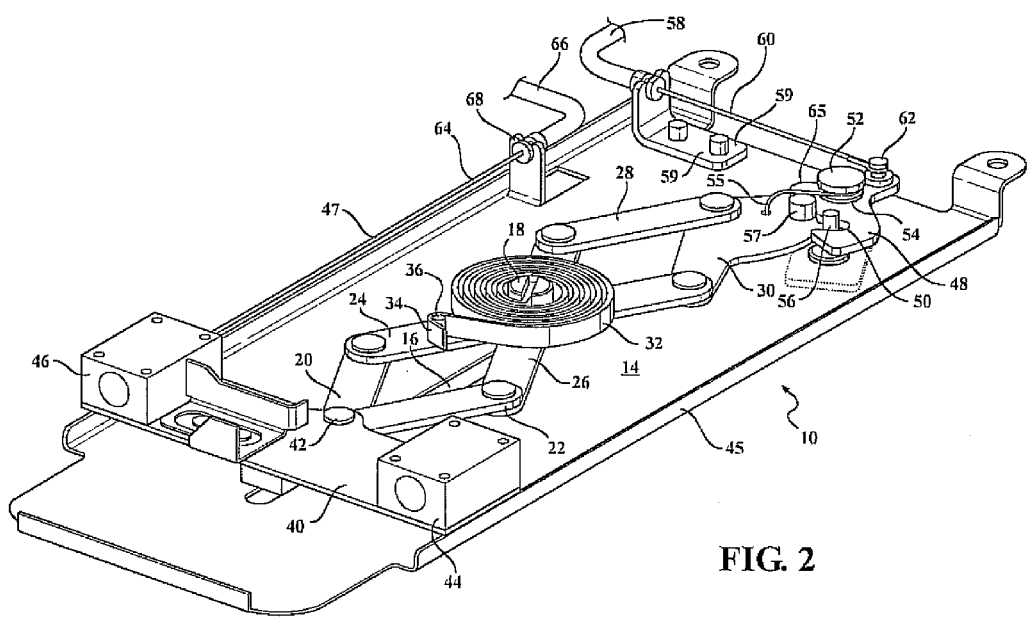
FIG. 2 is a rotated and enlarged perspective with the headrest support bun removed and better illustrating the features of the linkage mechanism in a substantially retracted position.
Figure 3:
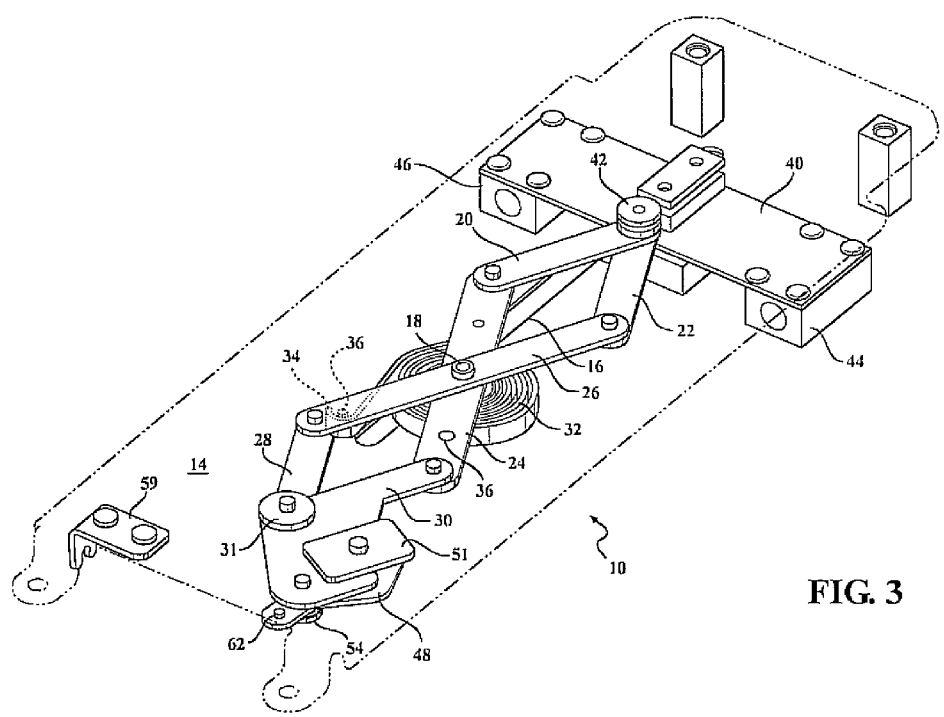
FIG. 3 is a rotated back side view illustrating the mechanism as visible through a substantially transparent depicted plate support.
Figure 4:
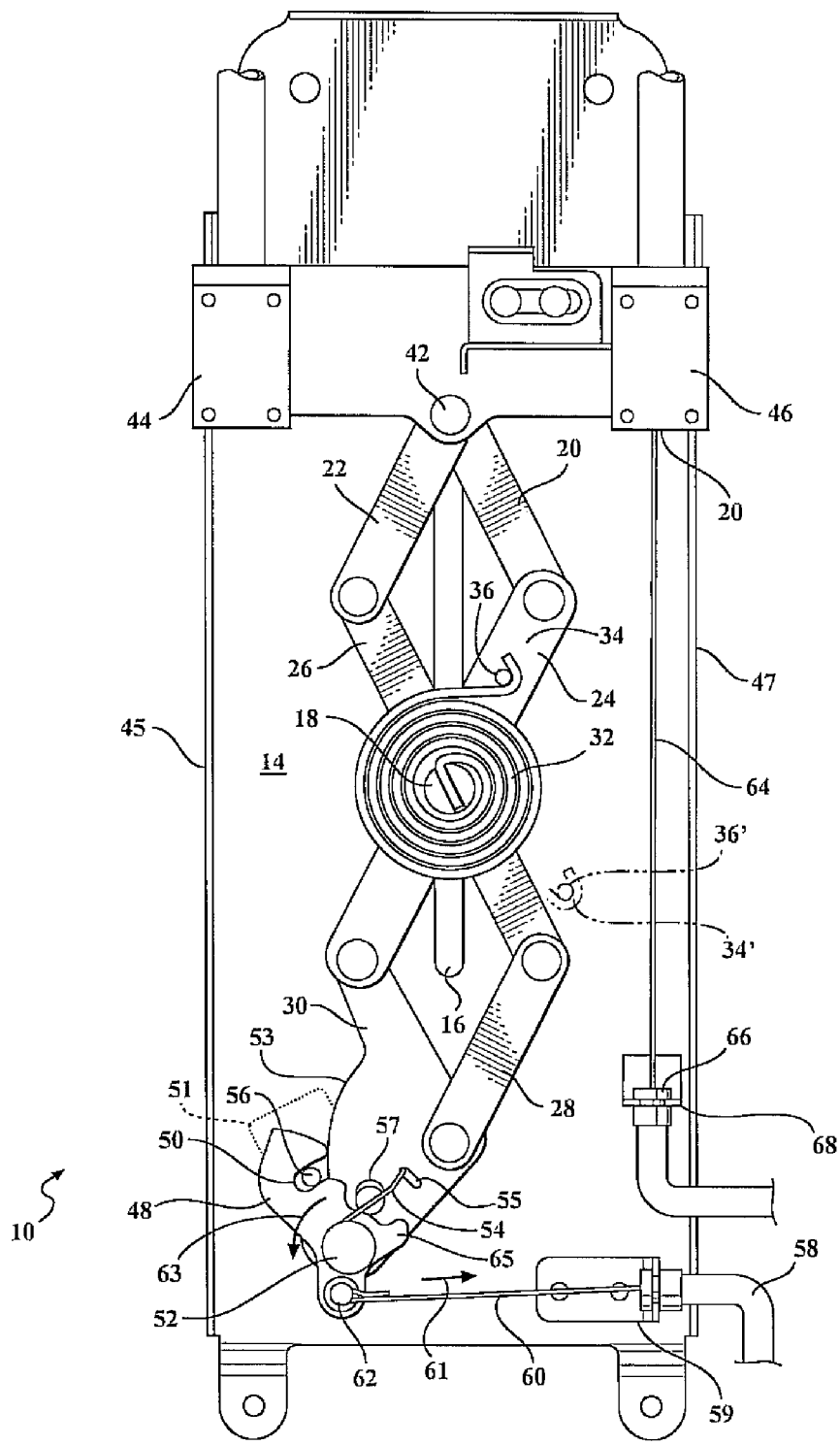
FIG. 4 is top plan view and again illustrating the features of the first pawl release cable and second forcible retraction cable secured to the headrest bun carriage, along with the catch portion configured on the pivotal locking pawl.

As further shown in each of FIGS. 1, 2 and 4, opposite linear edges of the plate support 14 further depict elevated rail edges 45 and 47 which linearly seat the carriage at locations between an upper most end of the plate support 14 (corresponding to a substantially fully extended position as shown in FIG. 1). Although not shown, it is understood that at least one or more intermediate and ascending/descending locations can be defined at increments along the plate support 14 and which would be representative of the carriage downwardly descending to a given retracted position.

A generally planar dimensioned and configured pawl 48 is provided, this exhibiting a generally hook shaped portion establishing a recess configured catch location 50. The pawl 48 is pivotally supported, via mounting rivet 52, in a biased fashion (further evidenced by a secondary clock spring 54) proximate a base end of the scissor linkage (in particular base link arm 30). The spring 54 includes an extending end 55 which engages base arm 30 and normally loads the pawl 48 in a clockwise direction as referenced in FIG. 1 and so that the recessed catch 50 engages a first pin 56 projecting from a reinforced surface location of the support plate 14 (see plate support 51 in FIGS. 1 and 3). The pin 56 projects upwardly from the generally planar support 14 proximate in location to an arcuate edge profile 53 (see FIGS. 4 and 5) of the base situated link arm 30, biasing the pawl 48 relative to the base arm 30 in the generally extended position of FIG. 1 and preventing the scissor linkage from prematurely collapsing due to the resistive engaging forces exerted by the pawl 48. The configuration of the arcuate edge profile 53 of the base link arm 30 is further such that it permits scissor folding/compressing motion associated with the link arm 30 to occur (between the extended position of FIG. 1 and the fully compressed position of FIG. 4) without interference by the pin 56.

Figure 5:
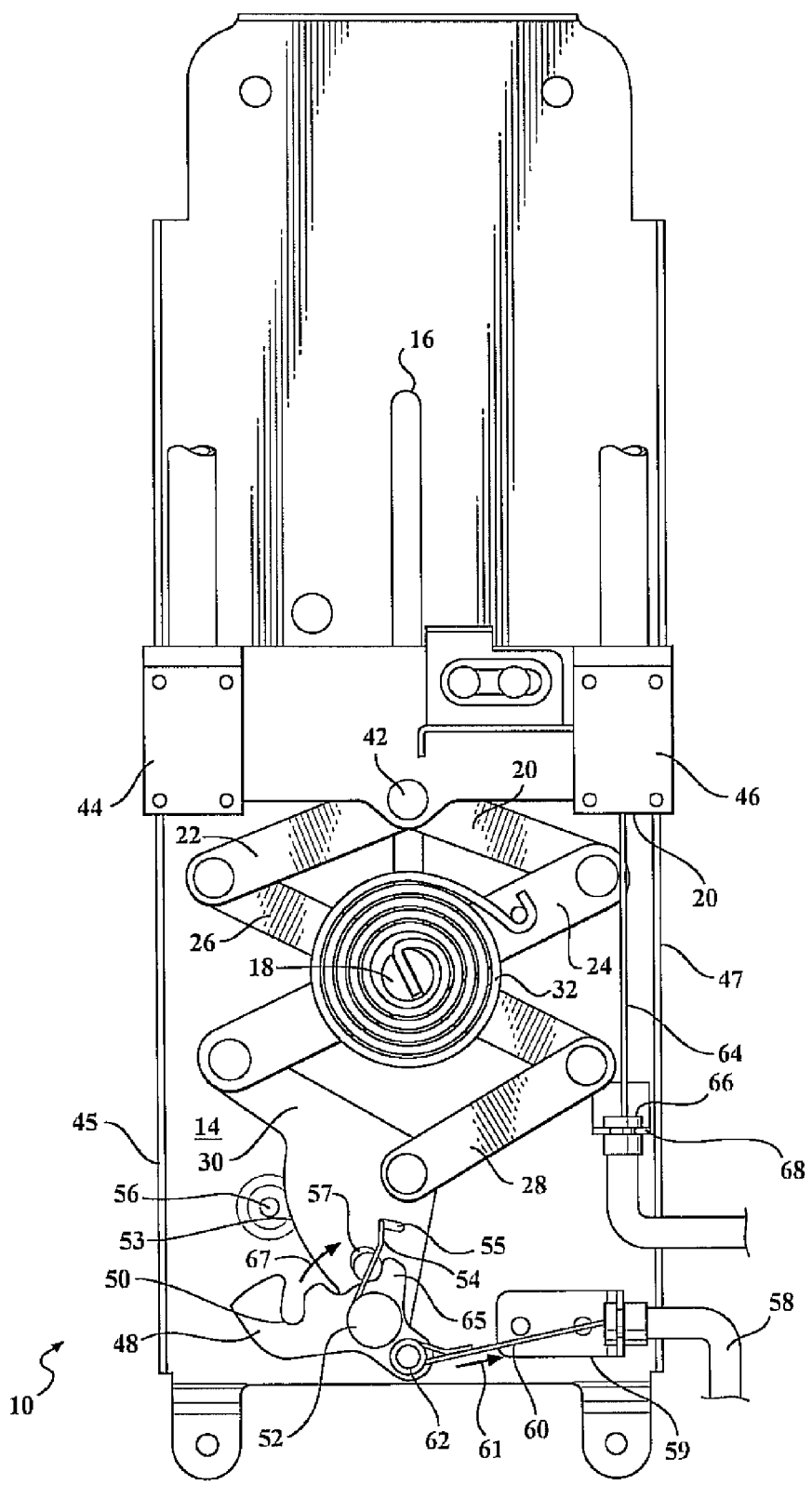
FIG. 5 is a succeeding plan view to that illustrated in FIG. 4 and similarly illustrating the scissor mechanism in a substantially retracted position.
Figure 6:
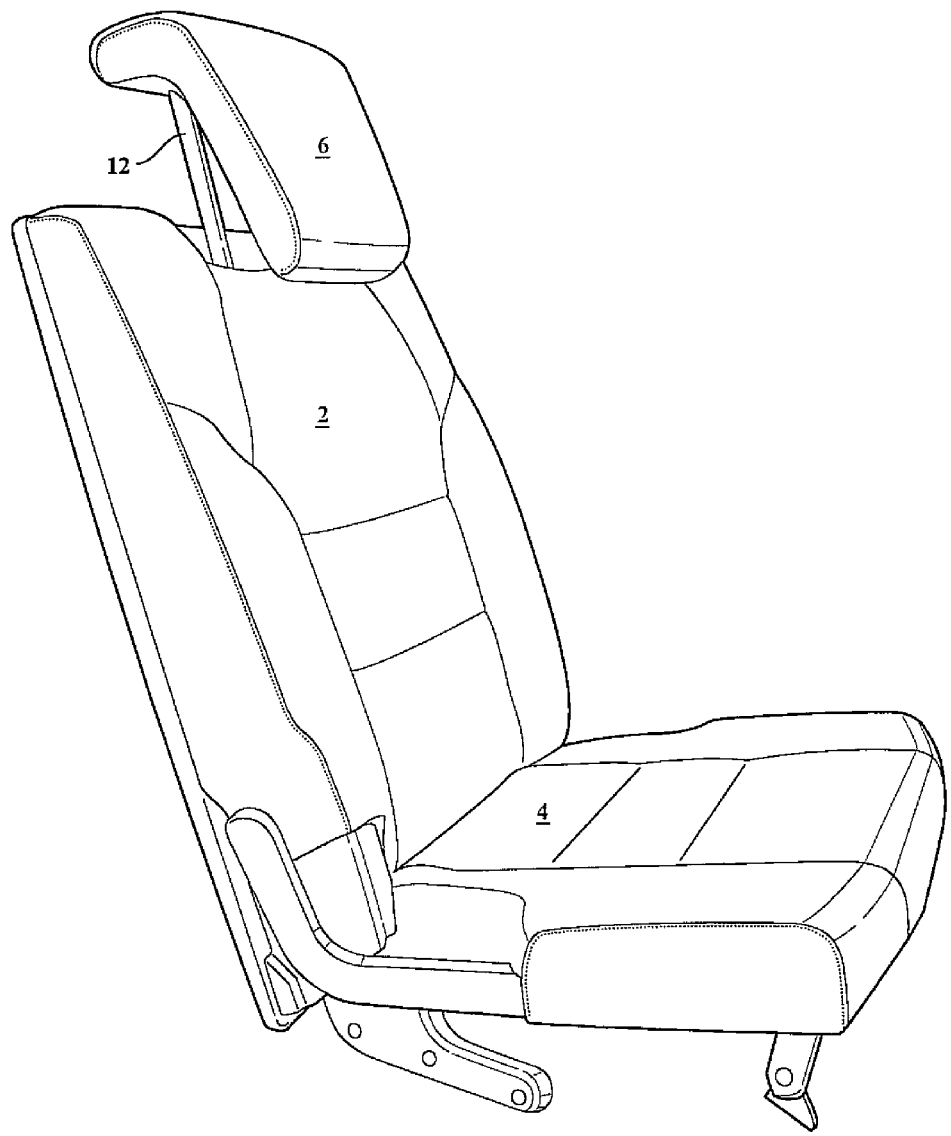
FIG. 6 is a perspective view of a dump and tumble seat incorporating the scissor retractable headrest.
Figure 7:
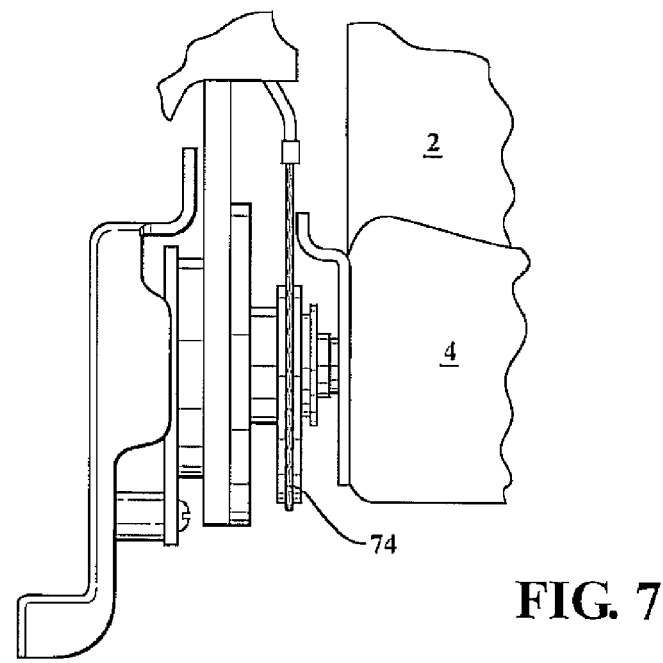
FIG. 7 is a fragmentary illustration of a cabling arrangement at a lower side location of the seat in FIG. 5 and including a redirection portion at a location proximate a pivot location of the seatback, and which is established between a seatback triggered release lever and at least a rod supporting carriage associated with the headrest mechanism.

As best depicted in FIGS. 1, 4 and 5, a first cable is provide and includes an outer fixed sheath or sleeve 58 secured to bottom located bracket 59 secured to the support plate 14 and from which extends an inner translatable portion 60, an end of which is engaged to a further rivet 62 secured to an extended portion of the pawl 48 which is offset from its pivotal connection 52. Upon being triggered by retraction of the cable (see arrow 61 in FIGS. 4 and 5), the pawl 48 is caused to be rotated in a counter clockwise direction (further arrow 63) against the bias of the secondary clock spring 54, with the catch location 50 caused to be unseated from the first pin 56 projecting from the surface location of a base situated link arm 30. Counterclockwise rotation of the pawl 48 continues until a further stop pin 57 projecting from a location of the base link arm 30 and travelling along a defined surface configuration of the pawl 48 engages a shoulder projection 65 and restrains over-rotation of the pawl 48.

Upon being freed from the pawl 48, the scissor linkage is capable of being pivotally compressed (again FIGS. 2 and 5), this corresponding to linear retraction of the end extending and headrest bun supporting rod 12, such as upon a user exerting a downward force on the outer headrest bun 6 and which results in the pairs of link arms compressing about their respective interconnecting pivot points. As further previously described, and although not shown, it is further understood that the headrest carriage 40 can be designed to establish and number of incrementally adjustable locations between the upper most extending position depicted in FIG. 1 and a most retracted position corresponding with the displaceable pin 18 abutting a bottom most location of the lengthwise extending channel 16 defined in the support plate 14.

A secondary cable is also provided and which is generally illustrated by translatable portion 64 extending from an outer stationary sleeve (see bracket supporting end fitting 66)

mounted to a secondary bracket support 68 (as shown this being formed from an incised and bent location of the support plate). A remote end of the translatable cable portion 64 engages a location 70 of the carriage 40, such that inner translation of the cable 64 results in slaved retraction of the carriage. The retracted cable 64 exerts the ongoing retraction/compressive forces on the scissor linkage until such time as the return rotation of the seatback 2 to its upright position relaxes the cable 64 and permits the carriage 40, rod 12 and headrest 6 to re-extend to its design position.

Figure 8:
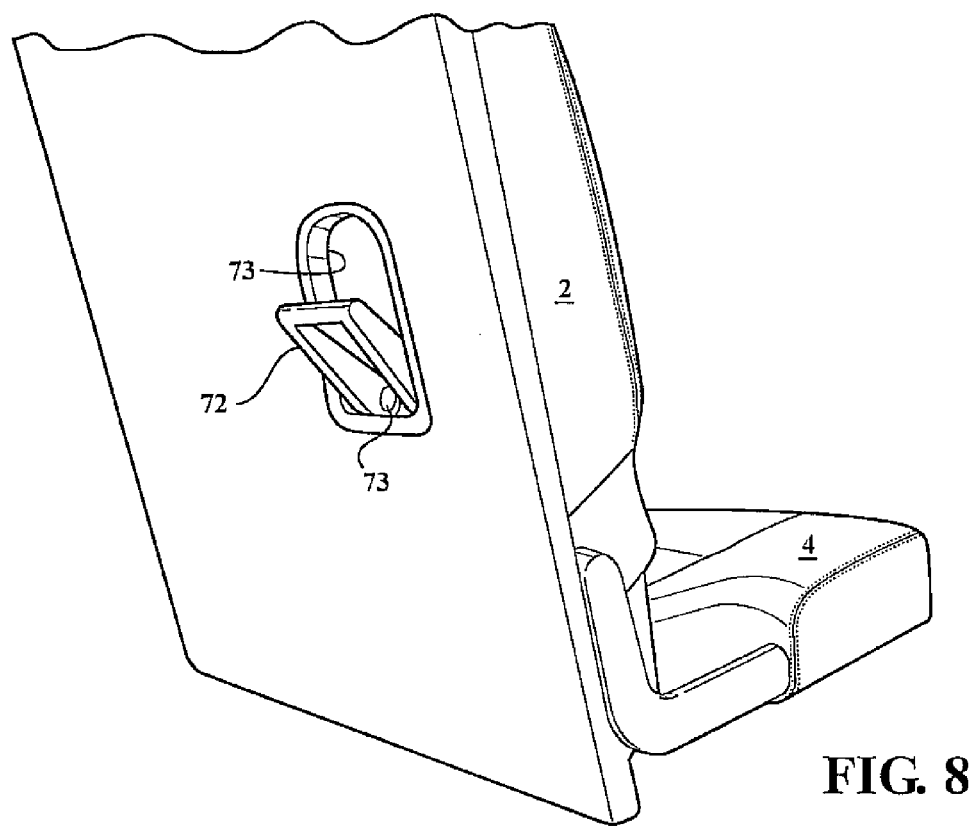
FIG. 8 is a rotated rear view of the seat back and illustrating the trigger release lever.
Figure 9:
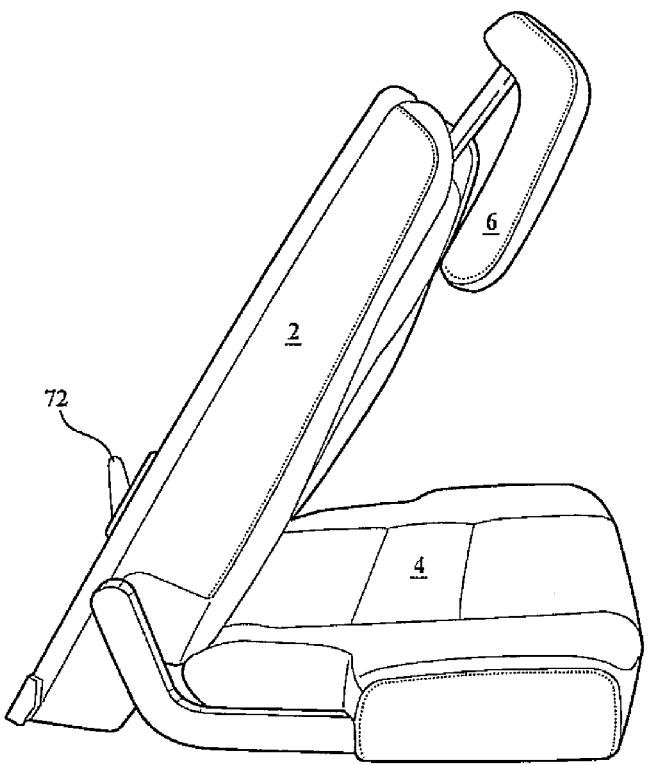
FIG. 9 is an intermediate release position of the forwardly dumping seatback and illustrating an intermediate retracting position of the shingled headrest relative to the seatback.
Figure 10:
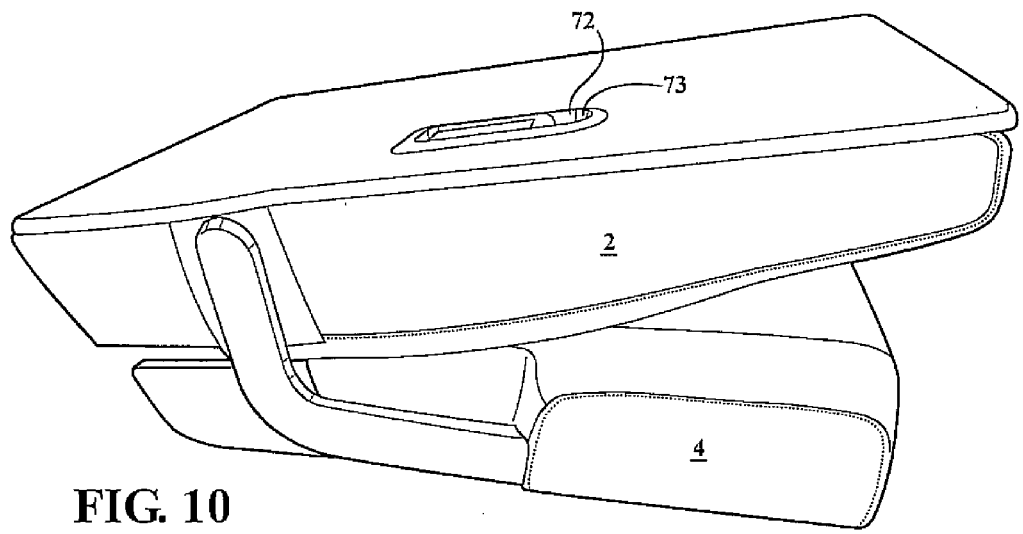
FIG. 10 is a further illustration of a forward dump position established by the seatback with the headrest substantially retracted within seatback.

As further depicted in each of FIGS. 8-10, a release lever 72 is depicted such as located in accessible fashion within a recess configuration 73 associated with a rear facing surface of the seat back 2, and from which one or more cables (see as further depicted at 74 in FIG. 7) extends to a corresponding seatback release mechanism (not shown but understood to trigger forward dumping motion of the seatback 2 relative to the seat bottom 4). The cabling arrangement is further such that the release lever 72 may directly actuate the carriage 40 or pawl 48 (and as depicted by respective inner displacing cable portions 64 or 60). Although not shown, this can include opposite ends of the inner displaceable cables 60 and 64 extending to contact locations associated with an integrated support location associated with the lever 72 in hidden fashion within the seatback interior, and such as which is located offset from a pivot pint 73 (see FIG. 8).

In this fashion, and upon triggering the lever 72, the seatback 2 is caused to pivot forwardly (via the action of such as the further referenced cable 74), whilst the secondary cable 66 in connection to the carriage 40 is separately actuated (or cooperatively actuated via an interconnection established with the seatback triggering linkage 74) such that retraction of the inner translating portion 64 forcibly compresses the scissor mechanism and retracts the carriage and associated headrest rod 12 against its spring coil 32 bias, this preferably occurring at a point at or prior to the seatback achieving a dump position relative to the seat bottom (as further shown in intermediate fashion in FIG. 8 and fully dumped position in FIG. 9). Timed retraction of the headrest is useful in preventing the forwardly rotating seatback from contacting the back surface of a forward row situated seat and/or further in order to provide adequate floor clearance during subsequent tumble of the seatback and bottom (such as further to permit occupant ingress/egress to or from a rear of the vehicle interior).

Concurrent with the scissor mechanism being substantially fully retracted against its coil spring bias force (again via inwardly translating cable 64) the pawl 48 is rotated (counterclockwise as depicted by directional arrow 63) so that its configured shoulder 59 establishes abutting engagement with the second defined stop pin 57, and at which point the linear extending bias force exerted by the clock spring 32 on the scissor mechanism are opposed and held in check by the ongoing holding forces exerted by inner displacing cable 64. Upon reverse and upright rotation of the seatback 2 to the upright position relative to the seat bottom 4, the headrest bun 6 is capable of being released by the triggering inward displacement of the first cable 60, this again rotating the pawl 48 in a reverse and return clockwise direction (arrow 67 in FIG. 5) thus allowing the bias force exerted by clock spring 32 against the scissor mechanism to return extend the headrest rod/bun support carriage 40 to its uppermost position (again FIG. 1), concurrent with reseating of the catch engaging location 50 of the pawl 48 with the first pin 56.

As previously described, and although not shown, a plurality of intermediate and incremental engagement locations can also be incorporated into the structural interface established between the carriage and plate shaped support and, in combination with a manually exerted force applied downward against the headrest bun, to provide any range of intermediate adjustment positions to the headrest.

Having described our invention, other and additional preferred embodiments will become apparent to those skilled in the art to which it pertains, and without deviating from the scope of the appended claims.

I claim:

1. A retractable headrest incorporated into a seatback pivotally associated with a seat bottom, said headrest comprising:
    a plate shaped support contained within the seatback;
    a scissor linkage exhibiting a plurality of interconnecting and overlapping link arms and pivotally secured at one end to said support;
    a spring biased rivet at an overlapping location of said link arms for travel along a linear extending channel defined in said support;
    a carriage connecting to the other end of said scissor linkage and which is linearly displaceable along said support;
    a headrest support rod connected to said carriage and extending from the seatback;
    a pawl pivotally supported proximate said one end of said scissor linkage, said pawl including a catch location which is biased in a first direction to engage a first pin extending from said support;
    a first cable connected to said pawl and a second cable connected to said carriage; and
    during rotation of the seatback from an upright design position to a forward dump position, actuation of said first cable pivoting said pawl against its bias to unseat said catch location from said pin, concurrent actuation of said second cable exerting a pulling force to compress said scissor linkage to a retracted position.

2. The invention as described in claim 1, further comprising a shingled headrest bun secured over said support rod.

3. The invention as described in claim 1, said plurality of interconnecting and overlapping link arms further comprising first, second and third pairs of individually overlapping and end-to-end pivotally connected link arms.

4. The invention as described in claim 1, further comprising a stop pin extending from a location of a selected link arm and engaging a shoulder location of said pawl at a maximum pivoted location.

5. The invention as described in claim 1, further comprising a main clock spring supported about said spring biased rivet, an outer curled projecting end of said spring engaging a further pin extending from a selected one of said overlapping link arms.

6. The invention as described in claim 5, further comprising a secondary clock spring having a first end engaged with a base link arm and an opposite end engaging said pawl into contact with said first pin.

7. The invention as described in claim 1, further comprising a seatback release lever situated on a surface of the seat back and to which remote locations of each of said first and second cables extend.

8. The invention as described in claim 7, each of said cables further comprising an outer fixed sheath through which extends an inner displaceable wire between said lever and said respective pawl and carriage.

9. The invention as described in claim 8, further comprising brackets secured to said support and in turn supporting extending ends of said outer sheath associated with each of said first and second cables.

10. A retractable headrest, comprising:

a plate shaped support embedded within a seatback;

a scissor linkage exhibiting a plurality of interconnecting link arms pivotally secured at one end to said support and at the other end to a carriage linearly displaceable along said support, said linkage exerting an extending bias against said carriage;

a rivet disposed at an overlapping intermediate location of a selected pair of said link arms for travel along a linear extending channel defined in said support;

a headrest support rod connected to said carriage and extending from the seatback; and a pawl pivotally supported proximate a base end of the scissor linkage, said pawl including a catch location which is biased in a first direction to engage a first pin extending from a location of said plate shaped support proximate a base link arm selected from said plurality of interconnecting link arms;

a first cable connected to said pawl and a second cable connected to said carriage; and during rotation of the seatback from an upright design position to a forward dump position, actuation of said first cable pivoting said pawl against its bias to unseat said catch location from said pin, concurrent actuation of said second cable exerting a pulling force to compress said scissor linkage to a retracted position.

11. The invention as described in claim 10, further comprising a shingled headrest bun secured over said support rod.

12. The invention as described in claim 10, said plurality of interconnecting link arms further comprising first, second and third pairs of individually overlapping and end-to-end pivotally connected link arms.

13. The invention as described in claim 10, further comprising a stop pin extending from a location of said base link arm and engaging a shoulder location of said pawl at a maximum pivoted location.

14. The invention as described in claim 10, further comprising a main clock spring supported about said rivet, an outer curled projecting end of said spring engaging a further pin extending from a selected one of said overlapping link arms and in order to exert an extensible biasing force to said scissor linkage.

15. The invention as described in claim 10, further comprising a secondary clock spring having a first end engaged with said selected link arm and an opposite end engaging said pawl into contact with said first pin.

16. The invention as described in claim 10, further comprising a seatback release lever situated on a surface of the seat back and to which remote locations of each of said first and second cables extend.

17. The invention as described in claim 16, each of said cables further comprising an outer fixed sheath through which extends an inner displaceable wire between said lever and said respective pawl and carriage.

18. The invention as described in claim 17, further comprising brackets secured to said support and in turn supporting extending ends of said outer sheath associated with each of said first and second cables.

19. A retractable headrest incorporated into a pivotal seatback, said headrest comprising:

a plate shaped support embedded within a seatback;

a scissor linkage exhibiting a plurality of interconnecting link arms pivotally secured at one end to said support and at the other end to a carriage linearly displaceable along said support;

a linearly displaceable rivet disposed at an overlapping intermediate location of a selected pair of said link arms for travel along a linear extending channel defined in said support;

a clock spring secured about said linearly displaceable pin and exhibiting a curled end engaging a selected of said overlapping link arms such that said linkage is biased in an extensible direction;

a headrest support rod connected to said carriage and extending from the seatback for receiving a headrest bun;

a pawl pivotally supported proximate a base end of the scissor linkage, said pawl including a catch location which is biased in a first direction to engage a first pin extending from a location of said plate shaped support proximate a base link arm selected from said plurality of interconnecting link arms;

a first cable extending from a first remote location and connected to said pawl, a second cable extending from a second remote location and connected to said carriage; and during rotation of the seatback from an upright design position to a forward dump position, actuation of said first cable pivoting said pawl against its bias to unseat said catch location from said pin, concurrent actuation of said second cable exerting a pulling force to compress said scissor linkage to a retracted position.

* * * * *